United States Patent [19]

Richardson

[11] Patent Number: 4,878,254
[45] Date of Patent: Oct. 31, 1989

[54] COMPACT SIGNAL ENHANCER

[76] Inventor: David Richardson, 2588 Knightsbridge La., Santa Clara, Calif. 95050

[21] Appl. No.: 947,853

[22] Filed: Dec. 30, 1986

[51] Int. Cl.$^4$ ............................................. H04B 9/00
[52] U.S. Cl. ........................... 455/601; 250/214 A; 330/59; 330/308; 455/606; 455/619
[58] Field of Search ............... 455/601, 606, 607, 617, 455/619; 250/214 A; 330/59, 308

[56] References Cited

U.S. PATENT DOCUMENTS 4,187,421  2/1980  Key et al. ............................ 455/601
4,509,211  4/1985  Robbins ............................... 455/603

FOREIGN PATENT DOCUMENTS 58-125923  7/1983  Japan ................................. 455/601
58-148537  9/1983  Japan ................................. 455/606
2122044  1/1984  United Kingdom ................ 455/606

Primary Examiner—Robert L. Griffin
Assistant Examiner—Leslie Van Beek

[57] ABSTRACT

Portable apparatus for receipt, amplification and re-broadcast of electromagnetic signals intended to remotely control certain electronic equipment, using photosensors and electronic devices to receive and amplify the signal.

12 Claims, 3 Drawing Sheets

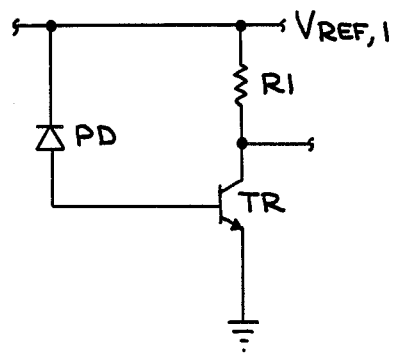
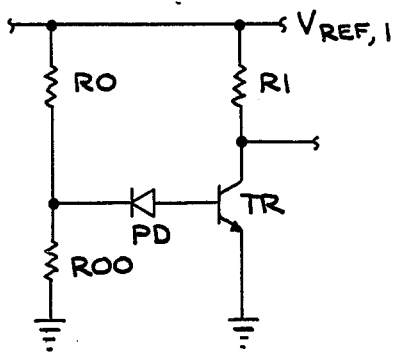
FIG. 4          FIG. 5
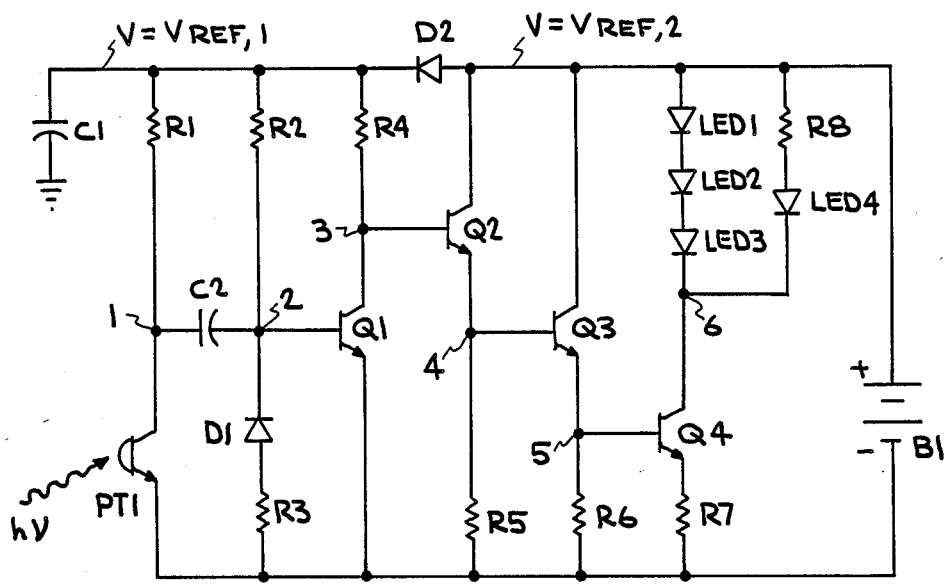
FIG. 6

COMPACT SIGNAL ENHANCER

FIELD OF THE INVENTION

This invention relates to receipt, enhancement and re-broadcast of an electromagnetic signal.

BACKGROUND OF THE INVENTION

Portable infrared remote controllers that are used to remotely control television; stereo and other electrical systems from a distance, usually 1–15 feet, often suffer from insufficient power so that the controllers perform erratically, even at close range. One could, of course, build a large, stationary unit to supply the needed power; but this would defeat the other desired features of such a controller, namely portability and compactness.

SUMMARY OF THE INVENTION

One object of the invention is to provide apparatus for receipt and re-broadcast of an electromagnetic communication signal.

Another object is to provide a portable enhancer for electromagnetic signals for use with remote controllers for various electronic equipment.

Other objects, and advantages thereof, will become clear by reference to the detailed description and the accompanying drawings.

In one embodiment, the apparatus is an electronic network comprising: a photosensitive means (such as a phototransistor or photodiode/transistor combination), initially off, positioned to receive the electromagnetic signal to be amplified, with its emitter connected directly to a ground reference voltage and its collector connected through a first resistor to a first positive reference voltage; second and third resistors and a first diode, arranged in series and connecting the ground reference voltage and the first positive reference voltage; a first capacitor connecting the first positive reference voltage to ground; a second capacitor connecting the collector of the photosensitive means to a point in the circuit lying between the second and third resistors; with this latter point also being directly connected to the base of a first transistor, with transistor emitter directly connected to the ground reference voltage and collector connected through a fourth resistor to the first positive reference voltage; the collector of the first transistor being also operatively associated with the base of a second transistor; with the emitter of the second transistor being connected through a fifth resistor to the ground reference voltage and the collector of the second transistor being connected to a second positive reference voltage through one or more light emitting diodes arranged in series; with the first positive referenc voltage being connected to the second positive reference voltage by a diode with its anode connected to the second positive reference voltage and its cathode connected to the first positive reference voltage; and with the second positive reference voltage being connected to the ground reference voltage through the terminals of a battery or other voltage source of voltage at least four volts. The battery voltage should be sufficient to handle the voltage drop across the one (or two or three) light emitting diodes arranged in series plus the base-collector voltage drop across the (saturated) second transistor.

In another embodiment, the apparatus is a radiation enhancer system comprising: a reflecting container having the form of a hollow convex body, open on one wall, with the container interior walls being substantially fully reflective to radiation of a predetermined wavelength $\lambda_1$; photosensitive means, such as a phototransistor or a photodiode/transistor combination, positioned adjacent to the open wall in the container interior, with the photosensitive means having a photosensor that is positioned to receive radiation reflected from substantially any portion of the container interior walls; a radiation diffuser, such as "bug-eye" lens, positioned at and covering substantially all the open wall of the container, to transmit and diffuse substantially all radiation of wavelength $\lambda_1$ that is incident on the diffuser from the exterior of the container; an electronic amplifier network having at least four terminals, with one terminal connected to the collector or other higher voltage terminal of the photosensitive means; a battery or other voltage source providing a voltage difference of substantially four volts or more, with its high voltage terminal and its low voltage terminal each connected to separate power supply terminals of the amplifier network; a light emitting diode ("LED") connected at its anode terminal to the high voltage terminal of the battery, with the LED cathode terminal being operatively associated with a terminal of the amplifier network; and a closed housing containing the electronic amplifier network, the LED, and possibly the radiation diffuser and the battery, with the housing material being at least partly transparent to radiation of wavelength $\lambda \geq \lambda_1$ and having substantially zero transparency for radiation of wavelength $\lambda \leq \lambda_2$ where $\lambda_2(<\lambda_1)$ is a second predetermined wavelength.

BRIEF DESCRIPTION OF THE DRAWINGS

FIGS. 4 and 5 are two configurations of a combined photodiode ("PD") and transistor ("TR") that may be used as the photosensitive means ("PT1") in FIG. 1 or FIG. 6.

FIG. 6 is a schematic view of one embodiment of an amplifier network useful in practising the invention.

DESCRIPTION OF THE PREFERRED EMBODIMENT

Figure 1:
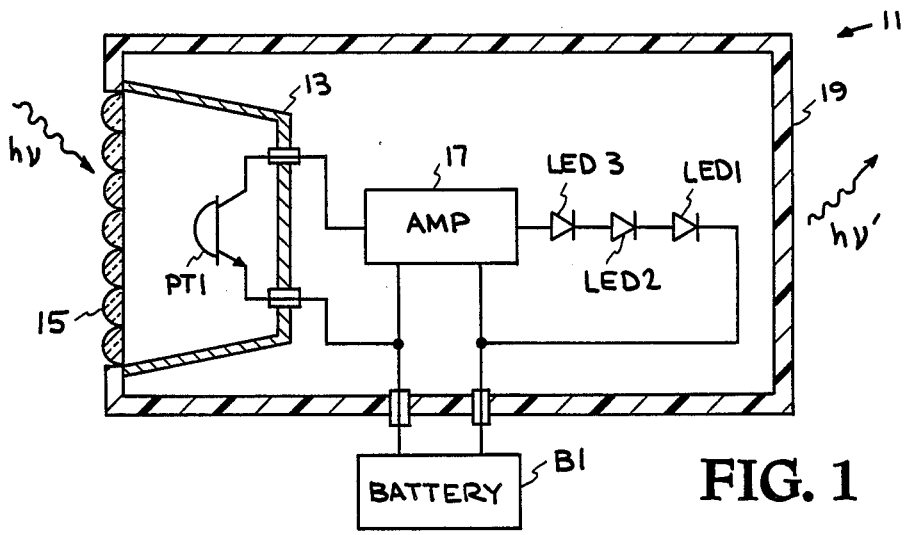
FIG. 1 is a schematic view of one emodiment of a system used in practising the invention.

FIG. 1 shows a schematic view of one emodiment of the invention, the entire unit. The unit 11 comprises a Si or other suitable photosensitive means PT1 housed in a container 13, the container interior being preferably a convex body with one open wall, having radiation-reflecting interior walls that are substantially fully reflecting (25-100 percent) at a first predetermined wavelength $\lambda_1$, diffuser (e.g., a "bug-eye" lens) 15 that will capture radiation photons (denoted h$\nu$) incident on the lens and diffuse or "spray" the radiation substantially uniformly on the interior walls of 13 for reflection and partial capture by PT1. The photosensitive means PT1 is electrically connected to an amplifier network 17 that is powered by a battery B1, and the amplifier network is connected to and drives one or more LEDs, LED1, LED2 and LED3, in series. The LED radiation, of visible ("red") or infrared wavelength, passes through a thin, radiation-transparent shield or housing 19 that surrounds the remainder of the unit 11, except possibly the battery B1 and the open wall of the container 13 spanned by the radiation diffuser.

Figure 2A:
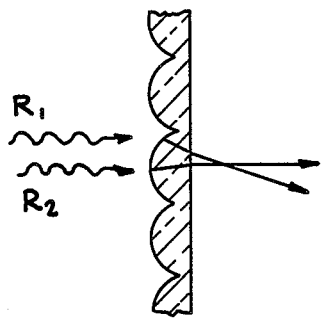
FIGS. 2A and 2B are schematic cross-section views of two "bug-eye" lenses, illustrating its facility in scattering initial parallel, adjacent radiation rays.
Figure 2B:
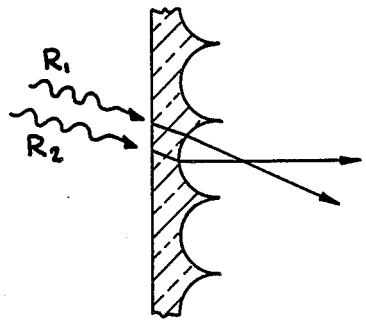

A "bug-eye" lens 15, as used herein is an array of approximately hemispherical or semi-cylindrical or other convex bubble lenses positioned at the front surface and a substantially planar back surface, as in FIG. 2A; or a substantially planar front surface with a rear surface of "concave" lens shapes, as in FIG. 2B. The lens material is substantially transparent to the incident radiation, and the array substantially covers the open wall of 13. Two adjacent, parallel incident rays such as $R_1$ and $R_2$ are, through refraction at the front and rear surfaces of 15, directed in different directions within the interior of the container formed by 13 and 15, as indicated. These rays then reflect several times from the interior walls of 13 and the back surface of 15; and a portion of such radiation is ultimately intercepted by the photosensor on the photosensitive means PT1. If the incident radiation wavelength $\lambda$ is in the appropriate range (0.7 $\mu$m$<\lambda<$0.95 $\mu$m in one embodiment) and of sufficient intensity, the radiation will drive PT1 partly or fully to saturation from the initial "off" position of PT1. The resulting signal will be passed througn and amplified by the amplifier network 17 and will cause the LED(s) to emit enhanced radiation h$\nu'$ that passes through the rear wall of the housing 19 to activate or control other electronic equipment.

Figure 3:
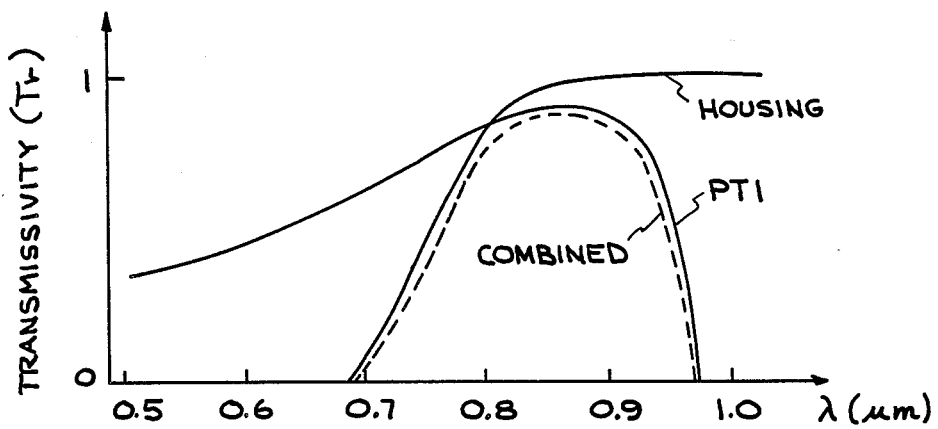
FIG. 3 is a graphic view, as a function of radiation wavelength received, of transmissivity of a representative housing material and of electronic responsiveness of a representative Si phototransistor or photodiode/transistor combination used in one embodiment of the invention.

FIG. 3 graphically exhibits the relative radiation transmissivity, Tr, of the material used for the housing 19 ($0 \leq Tr \leq 1$) and the relative responsiveness of a representative Si photosensitive means, both as a function of radiation wavelength. The Si pnotosensitive means response has a sharp drop-off as $\lambda$ increases to and beyond 0.95 $\mu$m but drops off only gradually at the low wavelength end ($\lambda<0.7$ $\mu$m). The housing material has a sharp drop-off in transmissivity as $\lambda$ decreases to 0.69 $\mu$m and below and at the end of the line increases quickly to its maximum value ($\lesssim 1$) as $\lambda$ increases above 0.8 $\mu$m. The combined result of these two wavelength responses, also shown in FIG. 2, manifests a sharp drop-off at both ends of a narrow wavelength band 0.69 $\mu$m$<\lambda$0.95 $\mu$m. The upper and lower bounds of this band are not crucial, and many other photosensitive means and housing material combinations would produce a qualitatively similar narrow band. A narrow bandpass for initial network response is desirable here. The amplifier system is always in a state of readiness; and when radiation of appropriate wavelength and intensity is received at PT1 the amplifier responds and a small current flows; this causes a modest current drain, measured in milliamps, of the battery B1. If the photosensitive means/housing combination is approximately uniformly responsive across a broad wavelength spectrum, stray electromagnetic radiation from any source (such as sunlight or the 120 Hz component of incandescent lamp radiation) could cause the system to be always "on", with a concomitant rapid drain of the battery. The relatively narrow bandpass characteristic shown in the "combined" curve in FIG. 3 ensures that the system will turn "on" only for radiation wavelengths of sufficient intensity in a narrow band such as 0.5 $\mu$m$<\lambda<$1 $\mu$m. The LEDs in FIG. 1 are chosen to emit radiation of wavelength substantially higher than the bottom of the transmissivity band for the housing material.

The photosensitive means PT1 in FIG. 1 may be a phototransistor such as the TRW OP500W or equivalent; or it may be a photodiode PD and a transistor TR in a combination such as that shown in FIG. 4 or FIG. 5. In FIG. 4 the anode of PD is connected to the base of TR, the emitter of TR is grounded, the cathode of PD is connected to a first reference voltage source $V_{ref,1}$ (discussed in connection with FIG. 6), the collector of TR is connected through a resistor R1 (having resistance $\approx$150 Ohms), and a free terminal is also connected to the collector of TR. In FIG. 5, the transistor TR is configured as in FIG. 4, the cathode of PD is connected to the base of TR, the anode of PD is connected by a resistor RO (of resistance $r_o$) to $V_{ref,1}$ and is grounded through a resistor ROO (of resistance $r_{oo}$); the ratio of these resistances $r_O/r_{OO}$ ($\sim$10-15) is chosen so that the voltage at the hose is approximately 0.3-0.6 volts.

Figure 7:
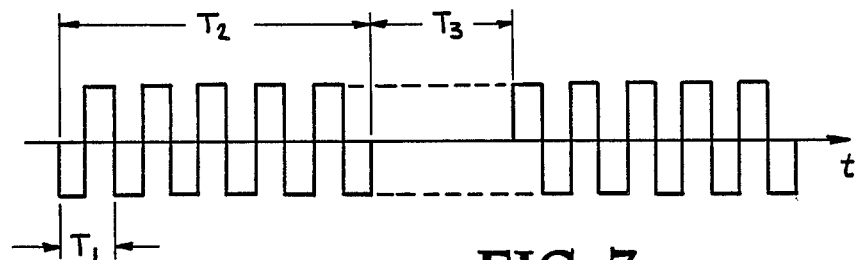
FIG. 7 is a graphic view of one arrangement of two or more bursts of pulses or radiation that may be received by the enhancer system in FIG. 1.

FIG. 6 illustrates one embodiment of an amplifier network useful in practising the invention in connection with FIG. 1. Electromagnetic radiation or "light" h$\nu$ of wavelength in a predetermined range is incident upon a photosensitive means PT1. The incident light may be produced by a remote controller (not shown) to be used for controlling electronic appliances such as television sets, stereo systems, area lighting/heating systems. etc. The radiation h$\nu$ activates the photosensitive means much as would an above-threshold signal introduced at the base of a conventional transistor: PT1, which is initially "off" , is partly turned "on" and the collector-emitter voltage $V(PT1)_{ce}$ abruptly falls to a value of about 0.3-0.6 v. (for a Si transistor). The emitter voltage at PT1 is identified with the voltage of the ground reference voltage, the photosensitive means PT1 maybe the TRW OP500W or any equivalent phototransistor. The OP500W photosensor is a Si npn transistor that has a spectral response throughout the wavelength range 0.56 $\mu$m$<\lambda<$0.95 $\mu$m that is at least 50 percent of its peak response, which occurs at $\lambda \approx$0.84 $\mu$m. Thus, this photosensitive means may be used in the visible and in the near infrared wavelength ranges. The light input delivered by the controller itself (not shown in FIG. 1) may be a periodic burst of pulses as in FIG. 7 with pulse period $T_1 \approx$25 nsec, with burst period $T_2 \approx (10-20)$ $T_1$, followed by a quiet period or time interval $T_3 = fT_2$ ($0<f<10$), followed by another periodic burst of pulses, with this cycle being repeated several times. The TRW OP500W phototransistor has an acceptance half angle for light of about 45° at wavelength $\lambda=0.875$ $\mu$m. The on-state collector current of the OP500W is approximately 1 milliamp for a radiation flux of 0.5 milliwatts/cm$^2$ and increases approximately linearly with the flux to a saturation current of around 50 mA.

Irradiation of the photosensor on PT1 drives the transistor partly or fully on so that the voltage across R1, V(R1) abruptly rises from 0 to as much as $V_{ref,1} - V(PT1)_{ce}$, where $V(PT1)_{ce}$ is the voltage difference ($\approx$0.3-0.6 v) between collector and emitter at PT1 when PT1 is fully saturated or "on". The resistance of R1 is $r_1$ 150 Ohms, with an acceptable range of perhaps 75-300 Ohms. The collector-base capacitance $c_{cb}$ is estimated to be 10 picofarads so that the time constant for response of PT1 is (at least) substantially $\tau_1 = (r_1)(c_{cb}) = 1.5$ nsec. Operation of the Miller effect at PT1 will increase this effective time constant to $\tau_1 \gtrsim 1$ μsec; but this is adequate to respond to a periodic burst of pulses hν at PT1 with pulse period $T_2 \gtrsim 25$ μsec.

The voltage at the collector PT1 (Node 1) falls by an amount V(R1) when PT1 is turned fully on, and this voltage decrease is differentiated across a capacitor C2 of capacitance substantially $c_2 \approx 1$ nanofarad (nf) to produce a voltage signal $S_2(t)$ at Node 2. The use of a modified voltage divider at Node 2, with resistors R2 (resistance $r_2 \approx 3$ Megaohms) and R3 (resistance $r_3 \approx 36$ kilo-ohms) and a diode D1 ($\Delta V \approx 0.3$–0.6 volts) in series, insures that the voltage at Node 2 will be modest. Inclusion of D1 as oriented also stabilizes the operating bias on transistor Q1 under large signal conditions, the voltage at Node 2 is initially sufficient that a transistor Q1 with base connected to Node 2 and emitter connected to the ground reference voltage, is initially on. When a pulse arrives at the photosensitive means PT1 the resulting negative-going voltage produced at Node 2 drives Q1 from the "on" to the "off" position. The collector of Q1 is connected across a resistor R4 (resistance $r_4 \approx 820$ kilo-ohms) to the first positive voltage "source" $V = V_{ref,1}$.

When Q1 turns off, the voltage signal $S_3(t)$ at collector Q1 (Node 3) rises to substantially $V = V_{ref,1}$ as no substantial current flows across the resistor R4. The base of a second transistor Q2 is connected to Node 3, with its emitter connected across a resistor R5 (resistance $r_5$ 47 kilo-ohms) to the ground reference voltage source and its collector connected to a second positive voltage $V_{ref,2} \approx V_{ref,1} + \Delta V(D2)$, where $\Delta V(D2)$ (>0) is the voltage drop across a diode D2 position between and connecting $V_{ref,1}$ and $V_{ref,2}$) as shown in FIG. 6. The diodes D1 and D2 may each be standard 1N4148 diodes, or their equivalents, with an associated voltage drop of about 0.3–0.6 volts. The abrupt rise in voltage at Node 3 turns the transistor Q2 (initially off) partly on; this produces a modest voltage rise at the emitter of Q2 (Node 4).

Node 4 is connected to the oase of a transistor Q3 that has its emitter connected across a resistor R6 (resistance $r_6 \approx 220$ Ohms) to the ground reference voltage and has its collector connected directly to the second positive voltage source $V_{ref,2}$. The modest voltage rise at Node 4 turns Q3 partially on. The voltage of the emitter of Q3 (node 5) rises, to a value of at most 1.5-2 V.

Node 5 is connected to the base of a transistor Q4, with its emitter connected across a seventh resistor R7 (resistance $r_7 \approx 1$ Ohm) to the ground reference voltage. The collector of Q4 (Node 6) is connected across one or more light emitting diodes, LED1, LED2 and LED3, arranged in series to the second positive voltage $V_{ref,2}$; a parallel line (optional) including an eighth resistor R8 (resistance $r_8 \approx 1$ kilo-ohm) and another light emitting diode LED4 in series, also connects Node 6 and the second positive voltage $V_{ref,2}$. Each of LED1, LED2 and LED3 may be a TRW OP290C GaAlAs infrared emitting diode or equivalent. Each of these LEDs drops 1.5-2.2 volts across itself so that the voltage at Node 6 is at most $V_{ref,2} - 2.2$ volts up to $V_{ref,2} - 1.5$ volts. The voltage rise at Node 5 is sufficient to drive Q4 from its initial off state to a fully on state so that substantial current ($\lesssim 5$ Amp) flows through each LED and produces visible and/or infrared radiation (0.7 μm<λ0.95μm) in response to arrival of a pulse or sequence of pulses at the photosensitive means PT1. A light emitting diode LED4 and its associated resistor R8 (resistance $r_8 \approx 1$ kilo-ohm) is optional and may be included to indicate by the presence of a radiating red light) that the other LEDs are being driven by Q4.

The network is driven by a battery or other voltage source B1 of nominal strength substantially four volts or more. The capacitor C1 (of capacitance $C1 \approx 47$ μf) is included at the front end so that, when the voltage $V_{ref,2}$ drops due to heavy current drain from B1, the diode D2 and the capacitor C1 will not permit any surges of voltage through the input stages (through PT1 or Q1) and $V_{ref,1}$ remains approximately constant. The representative values for all resistors, capacitors and diode voltages may be increased or decreased by a multiplicative factor of substantially five or less without cnanging the qualitative response of the network shown in FIG. 6. Each resistor, capacitor and diode is assumed to have at least two terminals, and each transistor and photosensitive means is assumed to have at least three terminals, a collector, a base (or photosensor) and an emitter; and each transistor may be npn or pnp.

The material used for the container or housing 19 may be any substantially clear plastic, such as acrylic, polycarbonate, polymethylmethacrylate, polystyrene, styrene and others, containing a dye that produces a reasoanably sharp cutoff in response at wavelengths of substantially 0.5-0.8 μm; this lower wavelength should be chosen below but adjacent to the aticipated lower bound on incident radiation that is to be received, amplified and re-broadcast.

Figure 8:
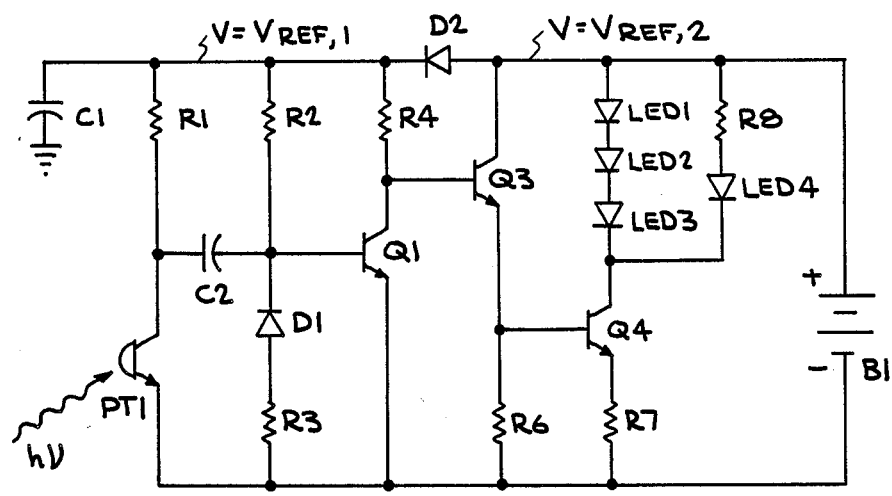
FIGS. 8 and 9 are schematic views of the circuit of FIG. 4 with one (FIG. 8) or two (FIG. 9) of the transistors and connecting resistors removed to simplify the circuit.
Figure 9:
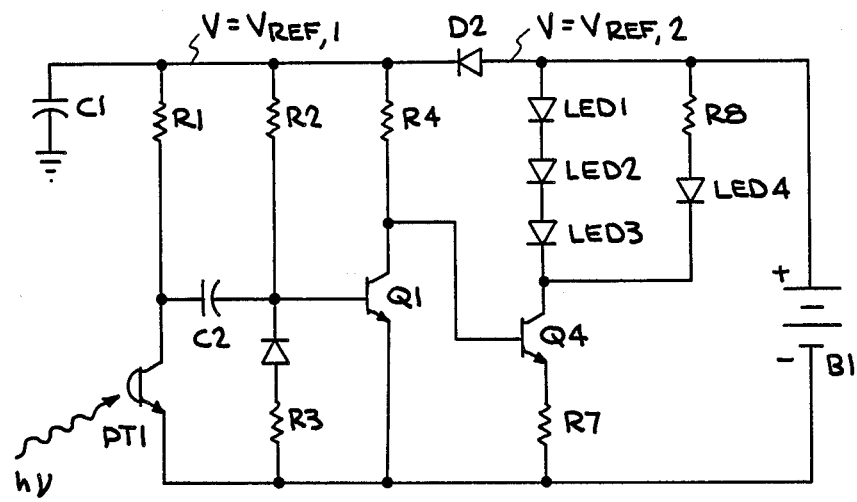

With reference to FIGS. 6, 8 and 9, the transistor Q2 and associated resistor R5 (as in FIG. 8) or the two transistors Q2 and Q3 and associated resistors R5 and R6 (as in FIG. 9) might be deleted from the amplifier network shown in FIG. 6, with the electrical connections reformed as shown. The function of Q2, Q3 and Q4 is to sequentially amplify an initial small current from Q1 so that the current produced at Q4 is sufficient to drive the LED(s). A single "super β" transistor (β=(collector current÷base current)~1000) with good response for very low base currents can be used in place of the combination of Q2, Q3 and Q4, if such transistor is available. The desired current at Q4 is more easily produced with two or more ordinary β transistors ($\beta \lesssim 100$), arranged in an emitter-to-base configuration as shown in FIG. 6.

Although the preferred embodiments have been shown and described herein, variation and modification may be made without departing from the scope of the invention.

I claim:

1. An electronic network for receipt, enhancement and re-broadcast of an electromagnetic signal, the network comprising:
    a source of ground reference voltage;
    a first source of positive voltage;
    a second source of positive voltage;
    a first capacitor of capacitance substantially 47 microfarads, with a first capacitor terminal connected to ground and second capacitor terminal connected to the first source of positive voltage;
    a first resistor of resistance substantially 150 Ohms with a first resistor terminal connected to the first positive voltage source;

photosensitive means having a collector connected to a second terminal of the first resistor and having an emitter connected to the ground reference voltage;

a second capacitor of capacitance substantially 1–10 nanofarads, with a first capacitor terminal connected to the collector of the photosensitive means;

a second resistor of resistance substantially 3 megaohms, with a first resistor terminal connected to the first positive voltage source and with a second resistor terminal connected to a second terminal of the second capacitor;

a first diode with one terminal connected to the second terminal of the second capacitor;

a third resistor of resistance substantially 36 kiloohms, with a first resistor terminal connected to the anode of the first diode and with a second resistor terminal connected to the ground reference voltage;

a fourth resistor of resistance substantially 820 kiloohms, with a first resistor terminal connected to the first positive voltage source;

a first transistor with its collector connected to a second terminal of the fourth resistor, its base connected to the second terminal of the second capacitor, and its emitter connected to the ground reference voltage;

a second diode with its cathode connected to the first positive voltage source and its anode connected to the second positive voltage source;

a second transistor with its base operatively associated with the collector of the first-transistor; a fifth resistor of resistance substantially one Ohm, with a first resistor terminal connected to the emitter of the second transistor, and with the second resistor terminal connection to the ground reference voltage;

a light emitting diode with its anode connected to the second positive voltage source and its cathode operatively associated with the collector of the second transistor; and a battery or other voltage source, providing voltage of substantially four volts or more, with its high voltage terminal connected to the second positive voltage source and its low voltage terminal connected to the ground reference voltage.

2. Apparatus according to claim 1, further including a second light emitting diode with its anode connected to said cathode of said first light emitting diode and its cathode operatively associated with said collector of said second transistor.

3. Apparatus according to claim 2, further including a third light emitting diode with its anode connected to said cathode of said second light emitting diode and its cathode operatively associated with said collector of said second transistor.

4. Apparatus according to claim 1, further including a third transistor with its collector connected to said second positive voltage source, its base operatively associated with said collector of said first transistor, its emitter connected to said ground reference voltage through a sixth resistor, and with its emitter connected to said base of said second transistor.

5. Apparatus according to claim 4, further including a fourth transistor with its collector connected to said second positive voltage source, its base operatively associated with said collector of said first transistor, its emitter connected to said ground reference voltage through a seventh resistor, and its emitter connected to said base of said third transistor.

6. Apparatus according to claim 1, further including a second light-emitting diode and a sixth resistor, with one resistor terminal connected to said second voltage source, with a second resistor terminal connected to the anode terminal of the second light-emitting diode, and with the cathode terminal of the second light-emitting diode connected to said collector of said second transistor.

7. Apparatus according to claim 1, wherein said photosensitive means is a phototransistor with an upper wavelength cutoff of substantially one micron.

8. Apparatus according to claim 1, wherein said photosensitive means comprises:

a transistor with its emitter connected to said ground reference voltage and its collector connected to said first positive voltage source through said first resistor; and a photodiode with its anode operatively associated with the base of this transistor and its cathode operatively associated with said first positive voltage source where this photodiode has an upper wavelength cutoff of substantially one micron.

9. A system for receipt, enhancement and re-broadcast of an electromagnetic signal, the system comprising:

a reflecting container with an interior that is substantially a convex body with one open wall, with the interior walls of the container being substantially fully reflective to electromagnetic radiation of a predetermined wavelength $\lambda_1$;

photosensitive means having a higher voltage terminal and a lower voltage terminal positioned adjacent to the open wall in the container interior, with the photosensitive means having a photosensor that is positioned to receive radiation reflected from substantially any portion of the container interior walls;

a radiation diffuser, positioned at and covering substantially all the open wall of the container, to accept radiation incident thereon from outside the container and transmit this radiation to substantially all interior walls of the container;

an electronic amplifier network having at least four terminals, with a first amplifier terminal connected to one terminal of the photosensitive means and with a second amplifier terminal connected to a second terminal of the photosensitive means;

a battery or other voltage source providing a voltage difference of substantially four volts or more, with its high voltage terminal connected to the second amplifier terminal and with its low voltage terminal connected to a third amplifier terminal;

an LED connected at its anode terminal to the high voltage terminal of the battery and with its cathode terminal being operatively associated with a fourth terminal of the amplifier network., a housing containing the reflecting container, the radiation diffuser, the photosensitive means, the electronic amplifier network and the LED with the housing material being at least partly transparent to electromagnetic radiation of wavelength $\lambda > \lambda_1$ and having substantially zero transparency for radiation of wavelength $\lambda < \lambda_2$, where $\lambda_2$ ($>\lambda_1$) is a second predetermined wavelength.

10. Apparatus according to claim 9, wherein said housing material is drawn from the class consisting of acrylic, polycarbonate, polymethylmethacrylate, polystyrene and styrene, containing a dye that produces a sharp lower wavelength cutoff at a wavelength substantially 0.5–0.8 microns.

11. Apparatus according to claim 9, wherein said radiation diffuser is a bug-eye lens.

12. Apparatus according to claim 9, wherein said electronic amplifier network comprises:
   a source of ground reference voltage;
   a first source of positive voltage;
   a second source of positive voltage;
   a first capacitor of capacitance substantially 47 microfarads, with a first capacitor terminal connected to ground and a second capacitor terminal connected to the first source of positive voltage;
   a first resistor of resistance substantially 150 Ohms with a first resistor terminal connected to the first positive voltage source;
   said pnotosensitive means having said high voltage terminal connected to a second terminal of the first resistor and emitter having said low voltage terminal connected to the ground reference voltage;
   a second capacitor of capacitance substantially 1–10 nanofarads, with a first capacitor terminal connected to the collector said high voltage terminal of said photosensitive means;
   a second resistor of resistance substantially 3 megaohms, with a first resistor terminal connected to the first positive voltage source and with a second resistor terminal connected to a second terminal of the second capacitor;
   a first diode with cathode connected to the second terminal of the second capacitor;
   a third resistor of resistance substantially 36 kilo-ohms, with a first resistor terminal connected to the anode of the first diode and with a second resistor terminal connected to the ground reference voltage;
   a fourth resistor of resistance substantially 820 kilo-ohms, with a first resistor terminal connected to the first positive voltage source;
   a first transistor with its collector connected to a second terminal of the fourth resistor, its base connected to the second terminal of the second capacitor, and its emitter connected to the ground reference voltage;
   a second diode with its cathode connected to the first positive voltage source and its anode connected to the second positive voltage source;
   a second transistor with its base operatively associated with the collector of the first transistor and its emitter connected to the ground reference voltage through a fifth resistor; and
   said battery or other voltage source having its high voltage terminal connected to the second positive voltage source and its low voltage terminal connected to the ground reference voltage.

* * * * *